(12) United States Patent
Khojastepour

(10) Patent No.: US 11,496,200 B2
(45) Date of Patent: Nov. 8, 2022

(54) PROBING AND BEAM SCHEDULING IN MULTI-USER SCENARIO

(71) Applicant: NEC Laboratories America, Inc., Princeton, NJ (US)

(72) Inventor: Mohammad Khojastepour, Lawrenceville, NJ (US)

(73) Assignee: NEC Corporation

( * ) Notice: Subject to any disclaimer, the term of this patent is extended or adjusted under 35 U.S.C. 154(b) by 0 days.

(21) Appl. No.: 17/143,422

(22) Filed: Jan. 7, 2021

(65) Prior Publication Data

US 2021/0218459 A1 Jul. 15, 2021

Related U.S. Application Data

(60) Provisional application No. 62/961,924, filed on Jan. 16, 2020, provisional application No. 62/959,319, filed on Jan. 10, 2020.

(51) Int. Cl.
*H04B 7/06* (2006.01)
*H04W 72/04* (2009.01)
(Continued)

(52) U.S. Cl.
CPC ........... *H04B 7/0695* (2013.01); *H04B 7/061* (2013.01); *H04L 5/0048* (2013.01); *H04W 24/06* (2013.01);
(Continued)

(58) Field of Classification Search
CPC ..... H04B 7/0695; H04B 7/061; H04L 5/0048; H04W 24/06; H04W 72/0413; H04W 72/042
See application file for complete search history.

(56) References Cited

U.S. PATENT DOCUMENTS

| | | | |
|---|---|---|---|
| 10,484,113 B1 * | 11/2019 | Benedetto | H04B 17/318 |
| 2010/0220597 A1 * | 9/2010 | Ji | H04W 16/10 |
| | | | 370/336 |

(Continued)

FOREIGN PATENT DOCUMENTS

| | | | | |
|---|---|---|---|---|
| EP | 1374467 A1 * | 1/2004 | ........... | H04L 1/0618 |
| WO | WO-2007114804 A1 * | 10/2007 | ........... | H04B 7/0608 |
| WO | WO-2019042228 A1 * | 3/2019 | ........ | H04W 72/1236 |

OTHER PUBLICATIONS

Jog et al., "Many-to-Many Beam Alignment in Millimeter Wave Networks", 16th USENIX Symposium on Networked Systems Design and Implementation (NSDI '19), Feb. 2019, 19 pages.

(Continued)

*Primary Examiner* — Jean B Corrielus
(74) *Attorney, Agent, or Firm* — Joseph Kolodka

(57) ABSTRACT

A computer-implemented method is provided for finding a data transmission beam from an Access Point (AP) to a User Equipment (UE) in a communication system. The method includes selecting a probing beam from a set of probing beams. The method further includes sending a plurality of probing packets from the AP to the UE using a dedicated probing beam selected for each probing packet from among the set of probing beams. The method also includes receiving feedback from the UE regarding the plurality of probing packets. The method additionally includes computing the data transmission beam based on the received feedback and the set of probing beams.

16 Claims, 7 Drawing Sheets

(51) Int. Cl.
*H04W 24/06* (2009.01)
*H04L 5/00* (2006.01)

(52) U.S. Cl.
CPC ..... *H04W 72/042* (2013.01); *H04W 72/0413* (2013.01)

(56) References Cited

U.S. PATENT DOCUMENTS

2010/0248677 A1* 9/2010 Ponce .................. G01S 19/34
 455/343.1
2019/0124610 A1* 4/2019 Stirling-Gallacher ......................
 H04H 20/16

OTHER PUBLICATIONS

Hosravi et al., "Efficient Beamforming for Mobile mmWave Networks", arXiv:1912.12118v1 [eess.SP] Dec. 23, 2019, pp. 1-9.
Michelus et al., "Optimal Beam Sweeping and Communication in Mobile Millimeter-Wave Networks", arXiv:1801.09306V1 [cS.IT] Jan. 28, 2018, pp. 1-23.

* cited by examiner

US 11,496,200 B2

PROBING AND BEAM SCHEDULING IN MULTI-USER SCENARIO

RELATED APPLICATION INFORMATION

This application claims priority to U.S. Provisional Patent Application No. 62/959,319, filed on Jan. 10, 2020, and U.S. Provisional Patent Application No. 62/961,924, filed on Jan. 16, 2020, incorporated herein by reference in their entireties.

BACKGROUND

Technical Field

The present invention relates to wireless communications and more particularly to probing and beam scheduling in a multi-user scenario.

Description of the Related Art

Directional transmission patterns (a.k.a. narrow beams) are the key to wireless communications in millimeter wave (mmWave) frequency bands which suffer from high path loss and severe shadowing. In addition, the propagation channel in mmWave frequencies incorporates only a few number of spatial clusters requiring a procedure to align the corresponding narrow beams with the Angle of Departure (AoD) of the channel clusters.

SUMMARY

According to aspects of the present invention, a computer-implemented method is provided for finding a data transmission beam from an Access Point (AP) to a User Equipment (UE) in a communication system. The method includes selecting a probing beam from a set of probing beams. The method further includes sending a plurality of probing packets from the AP to the UE using a dedicated probing beam selected for each probing packet from among the set of probing beams. The method also includes receiving feedback from the UE regarding the plurality of probing packets. The method additionally includes computing the data transmission beam based on the received feedback and the set of probing beams.

According to other aspects of the present invention, a computer program product is provided for finding a data transmission beam from an Access Point (AP) to a User Equipment (UE) in a communication system. The computer program product includes a non-transitory computer readable storage medium having program instructions embodied therewith. The program instructions are executable by a computer to cause the computer to perform a method. The method includes selecting a probing beam from a set of probing beams. The method further includes sending a plurality of probing packets from the AP to the UE using a dedicated probing beam selected for each probing packet from among the set of probing beams. The method also includes receiving feedback from the UE regarding the plurality of probing packets. The method additionally includes computing the data transmission beam based on the received feedback and the set of probing beams.

According to yet other aspects of the present invention, a computer processing system is provided for finding a data transmission beam from an Access Point (AP) to a User Equipment (UE) in a communication system. The system includes a memory device for storing program code. The system further includes a hardware processor operatively coupled to the memory device for running the program code to select a probing beam from a set of probing beams. The hardware processor further runs the program code to send a plurality of probing packets from the AP to the UE using a dedicated probing beam selected for each probing packet from among the set of probing beams. The hardware processor also runs the program code to receive feedback from the UE regarding the plurality of probing packets. The hardware processor additionally runs the program code to compute the data transmission beam based on the received feedback and the set of probing beams.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to probing and beam scheduling in multi-user scenario.

One or more embodiments of the present invention use a procedure having an objective called beam alignment (BA) which is configured to increase the beamforming gain for subsequent data communication. It is more efficient in terms of BA overhead and delay to design multi-user BA schemes which can perform beam management for multiple users collectively.

Herein, a class of multi-user BA schemes are proposed where the base station performs a one shot scan of the angular domain to simultaneously localize multiple users. The objective is to minimize the average of expected width of remaining uncertainty regions (UR) on the Angle of Departures (AoDs) after receiving users' feedbacks. Fundamental bounds on the optimal performance are analyzed using information theoretic tools. Furthermore, a beam design optimization problem is formulated and a practical BA scheme, which provides significant gains compared to the beam sweeping used in 5G standard is proposed.

Figure 1:
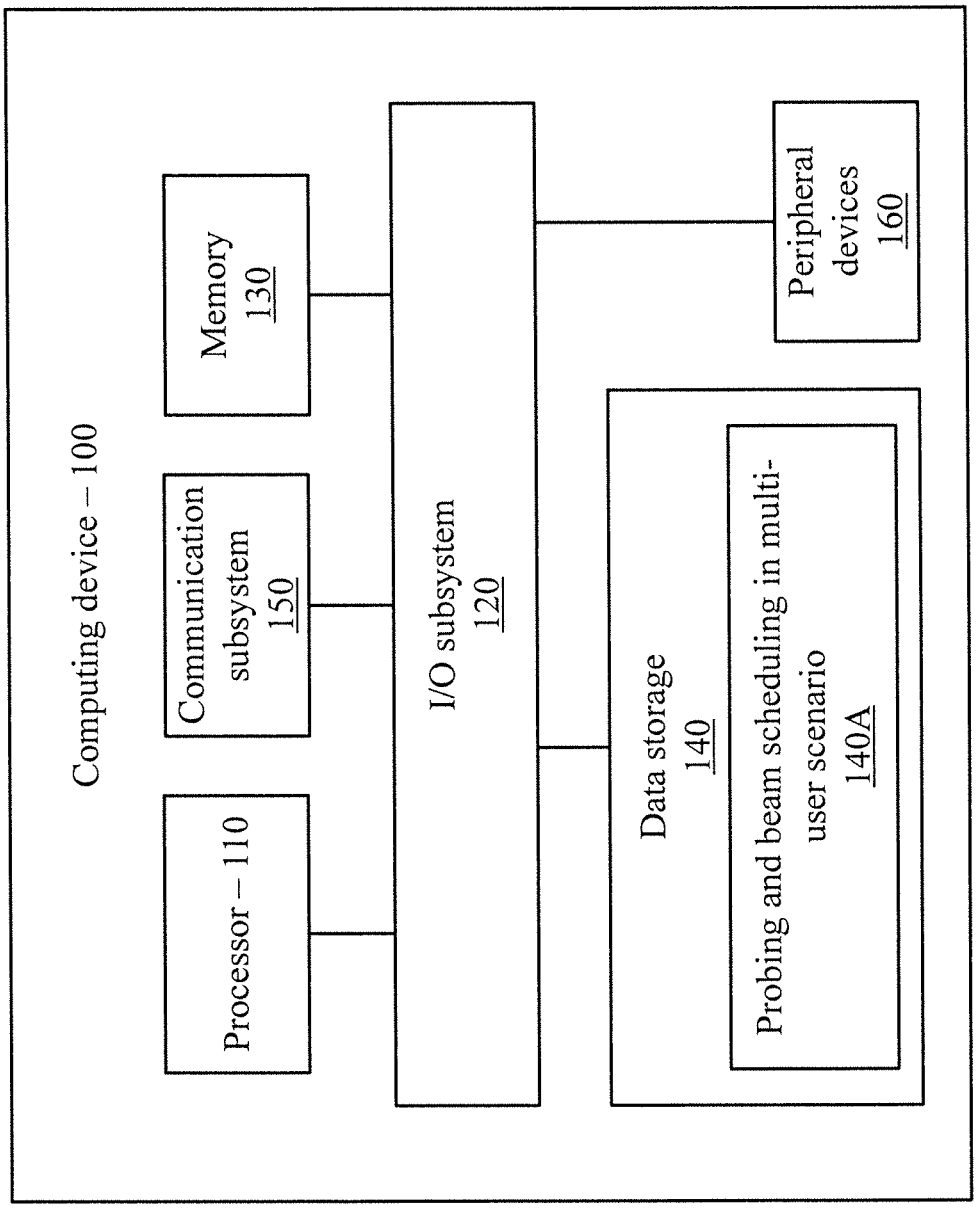
FIG. 1 is a block diagram showing an exemplary computing device, in accordance with an embodiment of the present invention.

FIG. 1 is a block diagram showing an exemplary computing device 100, in accordance with an embodiment of the present invention. Computing device 100 can be an access point (e.g., a base station), in accordance with one implementation. The computing device 100 is configured to perform probing and beam scheduling in a multi-user scenario.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for probing and beam scheduling in a multi-user scenario. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
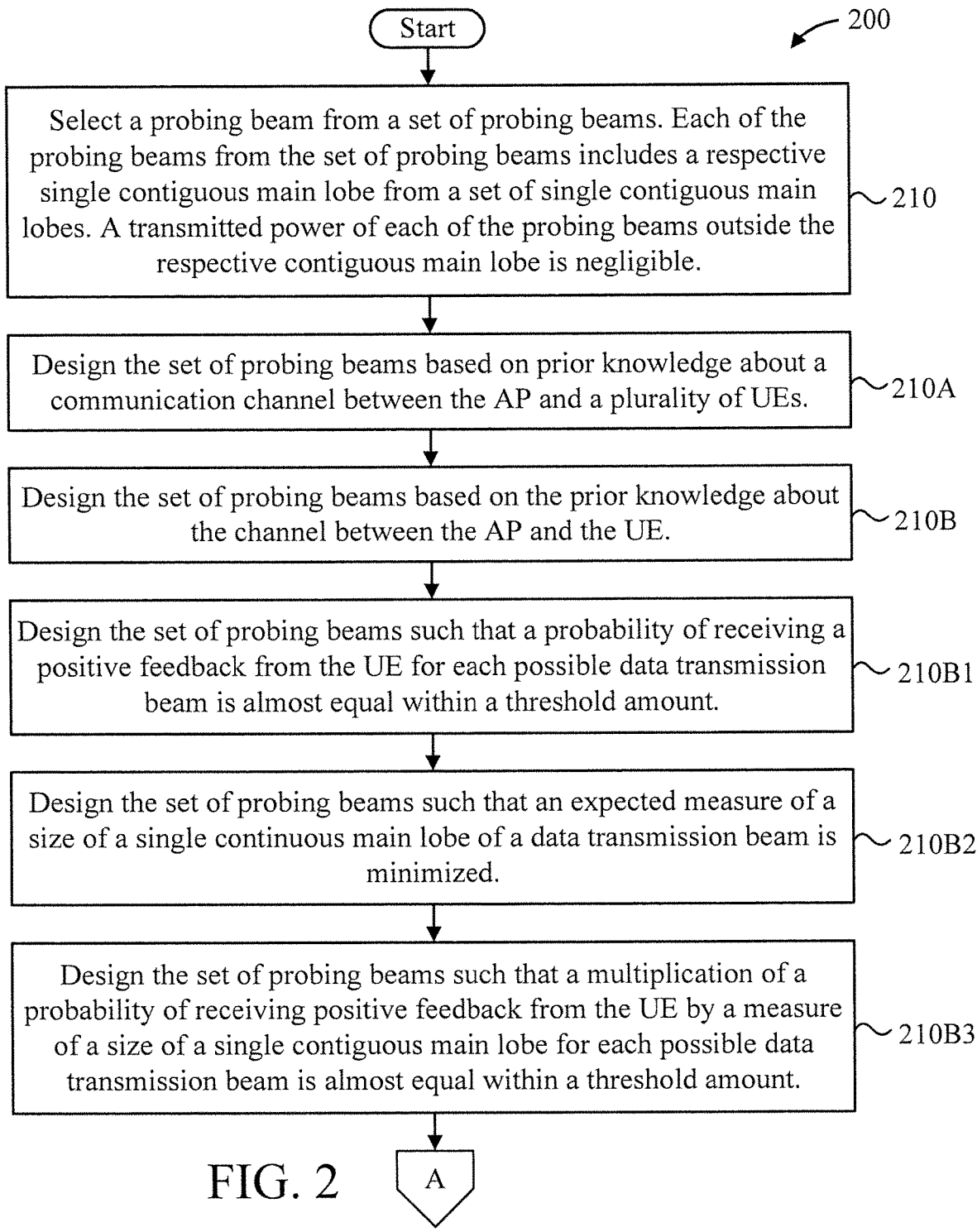
FIGS. 2-3 are flow diagrams showing an exemplary method for finding a data transmission beam from an Access Point (AP) to a User Equipment (UE) in a communication system, in accordance with an embodiment of the present invention.
Figure 3:
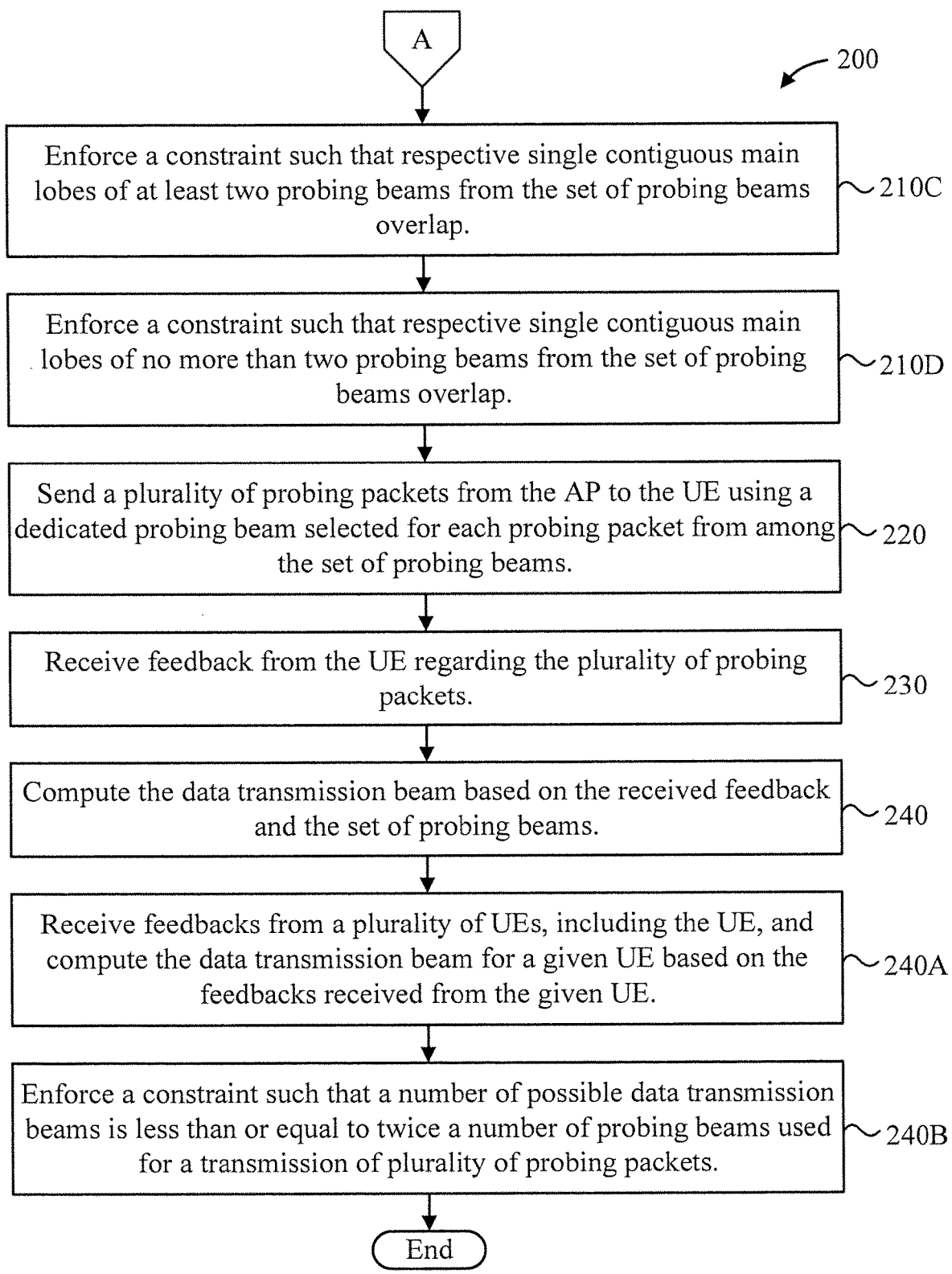

These and other variations of a hardware processor subsystem are also contemplated in accordance with embodiments of the present invention FIGS. 2-3 are flow diagrams showing an exemplary method 200 for finding a data transmission beam from an Access Point (AP) to a User Equipment (UE) in a communication system, in accordance with an embodiment of the present invention.

At block 210, select a probing beam from a set of probing beams. Each of the probing beams from the set of probing beams includes a respective single contiguous main lobe from a set of single contiguous main lobes. A transmitted power of each of the probing beams outside the respective contiguous main lobe is negligible.

In an embodiment, block 210 can include one or more of blocks 210A through 210D.

At block 210A, design the set of probing beams based on prior knowledge about a communication channel between the AP and a plurality of UEs.

At block 210B, design the set of probing beams based on the prior knowledge about the channel between the AP and the UE.

In an embodiment, block 210B includes one or more of blocks 210B1 through 210B3.

At block 210B1, design the set of probing beams such that a probability of receiving a positive feedback from the UE for each possible data transmission beam is almost equal within a threshold amount.

At block 210B2, design the set of probing beams such that an expected measure of a size of a single continuous main lobe of a data transmission beam is minimized.

At block 210B3, design the set of probing beams such that a multiplication of a probability of receiving positive feedback from the UE by a measure of a size of a single contiguous main lobe for each possible data transmission beam is almost equal within a threshold amount.

At block 210C, enforce a constraint such that respective single contiguous main lobes of at least two probing beams from the set of probing beams overlap.

At block 210D, enforce a constraint such that respective single contiguous main lobes of no more than two probing beams from the set of probing beams overlap.

At block 220, send a plurality of probing packets from the AP to the UE using a dedicated probing beam selected for each probing packet from among the set of probing beams.

At block 230, receive feedback from the UE regarding the plurality of probing packets.

At block 240, compute the data transmission beam based on the received feedback and the set of probing beams.

In an embodiment, block 240 can include one or more of blocks 240A through 240B.

At block 240A, receive feedbacks from a plurality of UEs, including the UE, and compute the data transmission beam for a given UE based on the feedbacks received from the given UE.

At block 240B, enforce a constraint such that a number of possible data transmission beams is less than or equal to twice a number of probing beams used for a transmission of plurality of probing packets.

A description will now be given regarding system model and preliminaries, in accordance with an embodiment of the present invention.

The downlink of a single-cell mmWave scenario including a BS and N users is considered. The case is considered where the propagation channel between the BS and the users consists of one path (spatial cluster). This assumption has been adopted in several prior studies, and is supported by experimental studies. It is assumed that the channels are stationary in the time interval of interest. Let $\Psi_j$, $j \in [N]$ denote the random AoD corresponding to the channel from the BS to the $j^{th}$ user. An arbitrary probability distribution function (PDF) $f\Psi_j(\cdot)$ is considered for $\Psi_j$ over $(0, 2\pi]$. This distribution reflects the prior knowledge about the AoD, which for example could correspond to the previously localized AoD in beam tracking applications.

It is assumed that the BS has a massive antenna array as envisioned for mmWave communications while the user has an omni-directional transmission and reception pattern for the BA phase. Furthermore, a single RF chain along is considered with analog BF at the BS due to practical considerations such as power consumption. To model the directionality of the BS transmission due to BF, a sectored antenna model is adopted, characterized by two parameters: a constant main-lobe gain and the angular coverage region (ACR) which is the union of the angular interval(s) covered by the main-lobe. The effect of the sidelobes is neglected. While this ideal model is considered for theoretical tractability, modifications may be applied to generalize the antenna model for practical scenarios where the beam pattern roll-off is not sharp.

Figure 4:
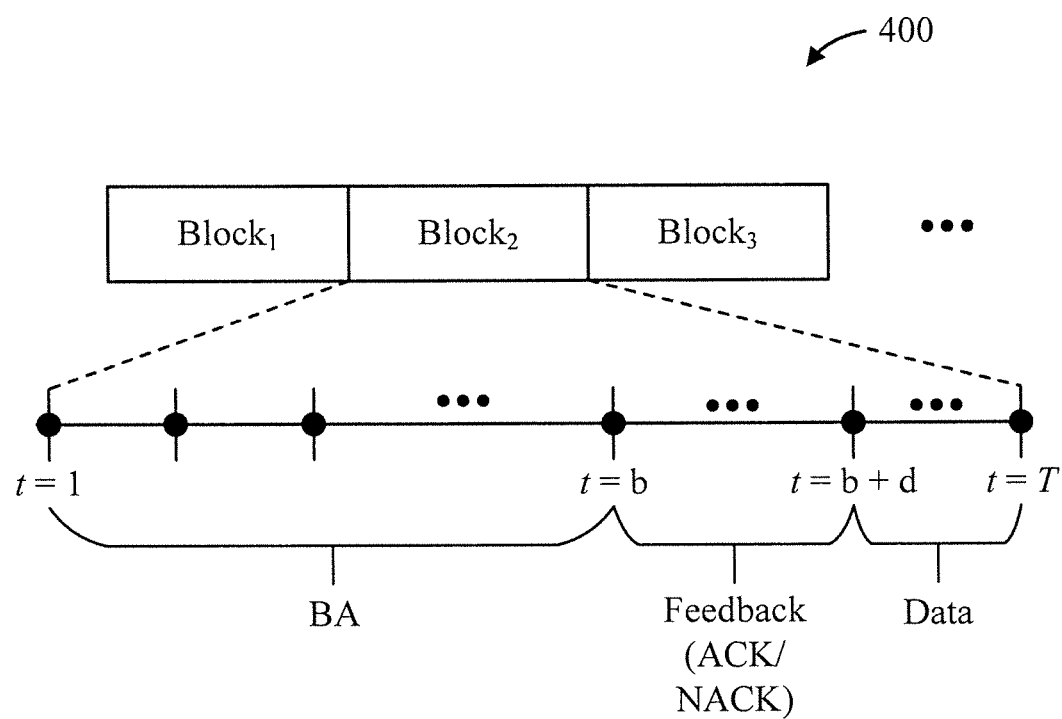
FIG. 4 is a block diagram showing a time slotted system, in accordance with an embodiment of the present invention.

A time division duplex (TDD) protocol is considered in which time is divided into blocks of T time slots as depicted in FIG. 4. At each block, the first b+d slots are used for NI-BA where the BS uses the first b slots to scan the angular space and the next d slots are used to collect the users' feedback (including the processing delays). The final T−b−d slots are used for data communications. Here, a focus is made on the BA phase whose main objective is to localize the users' AoDs as accurately as possible such that narrower beams (which are translated to higher BF gains) can be used to serve the users during data communication phase. At each time slot $i \in [b]$ during the BA phase, the BS transmits a probing packet using a beam with ACR $\Phi_i$ to, to scan that angular region. While the users are silent during the first b time slots, in the next d slots, each user sends a feedback message to the BS (e.g., through low-frequency control channels) including the indices of the beams whose corresponding probing packets are received by that user. Therefore, this feedback message can determine if the AoD of the user belongs to the ACR of each beam, considered as Acknowledgment (ACK), or not which is considered as negative ACK (NACK). Herein, it is assumed that the packets used for scanning during BA are received without noise at the users. Similarly, it is assumed that the feedback received at the BS is without any error. Based on the feedback, the BS infers an UR for the AoD of the channel of each user. During the data communication phase, a beam with an ACR covering the UR is used. Let B ($\Psi_j$) denote the UR or AoD of user j and $\Theta_i$ ($\Psi_j$)=$\Phi_i$ otherwise (NACL). Then, the following applies $$B(\Psi_j) = \cap_{i=1}^{b} \Theta_i(\Psi_j), j \in [N] \qquad (1)$$

For any BA strategy with a given set of scanning beams $\{\Phi_i\}_{i=1}^{b}$, let $\{u_k\}_{k=1}^{M}$ denote the set of all possible values for $B(\Psi_j)$, $j \in [N]$. Note that $M \leq 2^b$ and its exact value depends on the set of scanning beams. It can be shown that $u_k$s partitions the interval $(0, 2\pi]$, i.e., $u_k \cap u_{k'} = \emptyset$, $\forall k, k'$ and $\cup_{k=1}^{M} u_k = [0, 2\pi)$. Given a set of weights $\{w_j \geq 0\}_{j=1}^{N}$, $\Sigma_{j=1}^{N} w_j = 1$ for users and partition $\{u_k\}_{k=1}^{M}$, the weighted average of expected width of users' URs is defined as $$\bar{U}(\{\Phi_i\}_{i=1}^{b}) = \Sigma_{j=1}^{N} w_j \mathbb{E}[|B(\Psi_j)|], \qquad (2)$$

$$\text{where } \mathbb{E}[|B(\psi_j)|] = \Sigma_{k=1}^{M} |u_k| \int_{\psi \in u_k} f_{\psi_j}(\psi) d\psi \qquad (3)$$

$$B(\psi) = u_k \text{ for } \psi \in u_k \qquad (4)$$

Note that $|u_k|$ is the Lebesgue measure of $u_k$, which would correspond to the total width of the intervals in the case when $u_k$ is the union of a finite number of intervals. The dependence of $\overline{U}$ on $\{\Phi_i\}_{i=1}^b$ is in the expectation which is a function of partition $\{u_k\}_{k=1}^M$ created by on $\{\Phi_i\}_{i=1}^b$. The weights here could reflect priorities of the users, with $w_j=1/N$, $\forall_j \in [N]$ representing the equal priority case. The objective is to design the scanning beams $\{\Phi_i\}_{i=1}^b$ for a given b to minimize the weighted average of expected width of user's URs defined in Equation (2). In other words, the goal is to solve the following optimization problem:

$$\{\Phi_i^*\}_{i=1}^b = \underset{\{\Phi_i\}_{i=1}^b}{\arg\min}\overline{U}(\{\Phi_i\}_{i=1}^b) \tag{5}$$

Since the beams used for data communications cover the corresponding URs, the objective of the optimization is equivalent to minimizing the average of the scanning beams beamwidth used for data communication with users. $\overline{U}^*$ is defined as the optimal objective value in optimization (5).

A description will now be given regarding performance analysis and BA schemes, in accordance with an embodiment of the present invention.

Upper and lower bounds are provided as well as achievability schemes on $\overline{U}^*$ and associated BA schemes. To this end, it is shown that the multi-user BA problem can be translated to the problem of minimizing the $\overline{U}^*$ when there is only user whose AoD PDF is equal to the weighted average of the PDFs of the users. Then, the properties of the optimal partition $\{u_k\}_{k=1}^M$ are characterized and bounds on the performance of the system are provided along with a method for designing the optimal beams.

Lemma 1. The multi-user NI-BA problem with the objective function (2) is equivalent to a single user NI-BA problem with the objective of minimizing the expected width of the partition $\{u_k\}_{k=1}^M$ and the following prior on the AoD of that user:

$$f_\Psi(\psi) = \Sigma_{j=1}^N w_j f_{\Psi_j}(\psi), \psi \in (0, 2\pi] \tag{6}$$

Proof. Given any partition $\{u_k\}_{k=1}^M$ of the interval $(0, 2\pi]$ and weights $\{w_j\}_{j=1}^N$. Following (3), $$\Sigma_{j=1}^N w_j \mathbb{E}[|B(\Psi_j)|] = \Sigma_{j=1}^N [w_j \Sigma_{k1}^M |u_k| \int_{x \in u_k} f\Psi_j(x)dx] \tag{7}$$

$$= \Sigma_{k=1}^M |u_k| \int_{z \in u_k} [\Sigma_{j=1}^N w_j \omega \Psi_j(z)]dz = \mathbb{E}[|B(\Psi)|] \tag{8}$$

where the expectation is over the PDF in Equation (6).

Using Lemma 1, the BA problem is only considered for one user with the PDF in Equation (6). It is straightforward to show that the optimal scanning beams in the optimization problem (5) are the ones that can generate an optimal partition $\{u_k^*\}_{k=1}^M$ such that $$\{u_k^*\}_{k=1}^M = \underset{u_k, k \in [M]}{\arg\min} \sum_{k=1}^M |u_k|\mathbb{P}(\Psi \in u_k) \tag{9}$$

s.t. $|u_k| \geq 0$.

To bound $\overline{U}^*$, it is noted that the partition $\{u_k\}_{k=1}^M$ created by the beams used for scanning can be viewed as a set of quantization regions and the optimization in Equation (9) is equivalent to designing a quantizer that minimizes the expected width (i.e., Lebesgue measure) of the partition $\{u_k\}_{k=1}^M$.

Proposition 2. Consider a scalar quantizer with quantization regions $\{u_k\}_{k=1}^M$ that partition an interval $[a,b]$ and a real valued random variable X, defined on the interval $[a,b]$. The following applies:

$$2^{h(X)-\log M} \leq \mathbb{E}[|Q(X)|] \tag{10}$$

where $Q(x)=u_k$ for $x \in u_k$, $|u|$ refers to the Lebesgue measure of the set u, and $h(X)$ is the differential entropy of X. The bound in Equation (1) is tight when X is a uniform random variable.

Proof. Define the discrete random variable $\hat{X}=k$ if $X \in u_k$. Then $\hat{X}$ has the probability distribution $$p_k = \mathbb{P}(\hat{X}=k) = \mathbb{P}(X \in u_k) \text{ for } k \in [M]. \tag{11}$$

The following is set:

$$\overline{f}_x(x) = \frac{\mathbb{P}(X \in u_k)}{|Q(x)|} \text{ for } x \in u_k. \tag{12}$$

$$H(\hat{X}) = \sum_{k=1}^M -p_k \log p_k \tag{13}$$

$$= \sum_{k=1}^M \int_{u_k} -fx(x) \log(\overline{f}x(x)|Q(x)|)dx \tag{14}$$

$$= \int_a^b -fx(x) \log(\overline{f}x(x)|Q(x)|)dx \tag{15}$$

$$= \int_a^b -f_x(x)\log fx(x)dx + \tag{16}$$

$$\int_a^b -fx(x) \log|Q(x)|dx + \int_a^b -fx(x)\log\frac{\overline{f}x(x)}{fx(x)}dx$$

$$= h(X) - \mathbb{E}[\log|Q(X)|] + D_{KL}(fx(x)||\overline{fx(x)}). \tag{17}$$

Using $H(\hat{X}) \leq \log M$, $D_{KL}(\cdot||\cdot) \geq 0$, and Jensen's inequality on $\mathbb{E}[\log|Q(X)|]$ Equation (10) is obtained.

While proposition 2 is useful in bounding the performance for a given partition $\{u_k\}_{k=1}^M$, an important question in the design of a BA strategy is how the b scanning beams $\{\Phi_i\}_{i=1}^b$ can be optimized to result in the best partition in Equation (9). This question is investigated for two scenarios. First, the general case is considered where there are no constraints on the scanning beams $\{\Phi_i\}_{i=1}^b$, and next, for practical consideration, it is studied the scanning beams that are constrained to be contiguous, i.e., the case where the ACR of the scanning beams are contiguous angular intervals.

A description will now be given where there are no constraints on the scanning beams, in accordance with an embodiment of the present invention.

Theorem 3 bounds $\overline{U}^*$ and provides a method for designing the scanning beam $\{\Phi_i\}_{i=1}^b$ when there are no constraints on the beams.

Theorem 3. The optimal value of the objective function in optimization problem (5) $\overline{U}^*$ is bounded as follows $$\frac{2^{h(\Psi)}}{2^b} \leq \overline{U}^* \leq \frac{2\pi}{2^b}, \tag{18}$$

where $h(\Psi)$ is the differential entropy of random variable $\Psi$ in PDF in Equation (6).

Proof. Lower bound: A set of BA scanning beams $\{\Phi_i\}_{i=1}^b$ results in a partition $\{u_k\}_{k=1}^M$ of the AoD with $M \leq 2^b$. The BA procedure can be thought of as quantization of the angle IP whose distribution is given in Equation (6). Using Lemma 1, the lower bound in the theorem is obtained.

Figure 5:
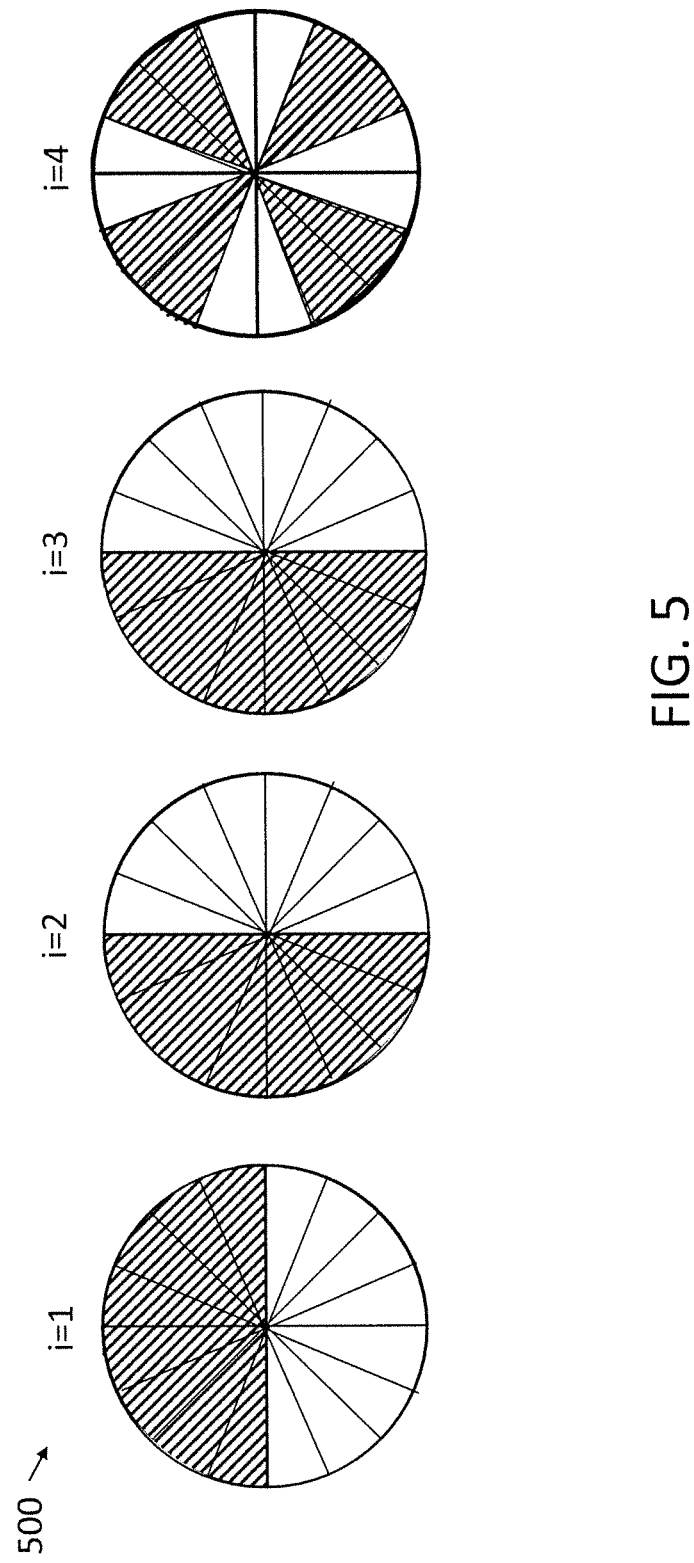
FIG. 5 is a block diagram showing an exemplary proposed BA strategy for b=4 in Theorem 3, in accordance with an embodiment of the present invention.

Upper bound: consider the following beams $$\Phi_i = \left\{ \left(\frac{\pi}{2^{i-1}}, \frac{3\pi}{2^{i-1}}\right] + \frac{j\pi}{2^{i-3}} \mid j = \{0, 1, \ldots, 2^{i-2}-1\} \right\}, \quad (19)$$

for $i \in [b]$. These collection of beams 500, illustrated in FIG. 5 for b=4, result in $$\bar{U} = \frac{2\pi}{2^b}.$$

When the priors on the user's AoDs are not available, one may assume uniform distribution in which case the upper and lower bounds in Theorem 3 meet at $$\frac{2\pi}{2^b},$$

which is achievable by the beams given in (19).

In the following, it is shown an important property of the optimal partition $\{u_k^*\}_{k=1}^M$ in Equation (9), then using this property, the optimal partition is design and a possible set of scanning beams is provided based on the optimal partition.

For a given partition $\{u_k\}_{k=1}^M$, let $a_k=|u_k|$ be the width of the kth region of the partition, hence $\Sigma_{k=1}^M a_k=2\pi$. Without loss of generality, it is assumed that $a_1 \leq a_2 \leq \ldots \leq a_M$. Consider differential arcs of width $d\theta$ and probability $f_\Psi(\theta) d\theta$, where $f_\Psi(\cdot)$ is given by Equation (6). Clearly, for any two arcs, say at $\theta_i$ and $\theta_j$ with probabilities $f_\Psi(\theta_i)d\theta_i \geq f_\Psi(\theta_j)d\theta_j$, the one with the larger probability (in this case $\theta_i$) should belong to the region of the partition with smaller width in order to minimize the objective value in (9), otherwise the association can be reversed to achieve smaller value in Equation (9). Therefore, the following proposition exists.

Proposition 4. For the optimal partition $\{u_k^*\}_{k=1}^M$, any two differential arcs at $\theta_i$ and $\theta_j$ in partition regions $u_i^*$ and $u_j^*$, respectively, satisfy $f_\Psi(\theta_i) \geq f_\Psi(\theta_j)$ if $|u_i| < |u_j|$.

Let us consider the case that $f_\Psi(.)$ is a monotonic function over the interval $(0,2\pi]$. Using Proposition 4, it is noted that the optimal partition $\{u_k^*\}_{k=1}^M$ consists of M contiguous intervals $u_i^*=x_i^*,x_{i+1}^*$ that are defined only based on the boundary points $x_i^*$, $i|M|$ with $x_{M+1}^*=x_1^*$. This simplifies the search for the optimal partition $\{u_k^*\}_{k=1}^M$ to finding the boundary values $x_i^*$, $i \in |M|$ which are the solutions to the following optimization $$\arg\min_{x_i, i \in |M|} x_{i+1} - x_i \int_{x_i}^{x_{i+1}} f_\Psi(x)dx. \quad (20)$$

Building on the design idea for monotonic PDF for AoD, it is noted that there is always a one-to-one mapping g: $(0,2\pi] \to (0,2\pi]$ where PDF of $g(\Psi)$ is monotone over the interval $(0,2\pi]$ for any PDF of AoD W. Hence, by designing the optimal partition for $g(\Psi)$, one can find the corresponding optimal partition for $\Psi$.

Finally, the optimal scanning beams $\{\Phi_i\}_{i=1}^b$ are defined in terms of optimal partition $\{u_k^*\}_{k=1}^M$. Combining, the following is obtained:

Theorem 5. The optimal scanning beams in (5) are given by $$\Phi_i^* = \cup_{j \in S_i} u_j^*, i[b], \quad (21)$$

where $u_i^* = g^{-1}((x_i^*, X_{i+1}^*])$, with $x_i$, $i \in [2^b]$ being solutions of Equation (2), $g(\cdot)$ is a mapping such that $f_{g(\Psi)}(\cdot)$ is monotone over the interval $(0,2\pi]$, and $S_i$ is the set of all values in $\{1, \ldots, 2^b\}$ for which the ith bit in their binary representation is zero.

The optimization in (20) can be solved using standard linear programming software when the objective function is convex. While, in general, this optimization can be non-convex for arbitrary PDFS, for small values of b, once can find a near optimal solution for an exhaustive search over a fine grid on $(0,2\pi]$. Trivially, for large values of b, the upper and lower bounds in Theorem 3 gets closer and the explicit construction for the upper-bound in Theorem 3 get closes and the exhibit construction for the upper-bound in Theorem 3 performs close to the optimal.

In practice, it is not often feasible to realize the beams with non-contiguous ACR and sharp roll-offs. Therefore, while the approach of the present invention provides the characteristics of the optimal scanning beams described in Theorem 5, it may not necessarily lead to a practical NI-BSA. To address this issue, the problem of NI-BA optimization with contiguous beams is addressed next.

A description will now be given regarding scanning with contiguous beams, in accordance with an embodiment of the present invention.

Here, the ACR of the scanning beams is constrained to be contiguous intervals. When using contiguous beams, the resulting URs may be non-contiguous. In the following, it is shown that for the optimal contiguous beams $\{\Phi_i\}_{i=1}^b$, the resulting URs $\{u_k\}_{k=1}^M$ are also contiguous. The importance of this result is that is not only addresses the practicality of the beams used in the BA phase, but also in the data communication phase where the BS uses a beam covering user's UR to transmit to that user.

Proposition 6. For b contiguous scanning beams $\{\Phi_i\}_{i=1}^b$, there are at most M=2b URs in the resulting partition $\{u_k\}_{k=1}^M$. Furthermore, without loss of generality, the URs in the optimal partition minimizing Equation (9) are contiguous.

Proof. A contiguous scanning beam results in an interval, which is described by its two end points. The collection of b contiguous beams are thus represented by at most 2b such end points, resulting in at most M=2b URs. Given contiguous scanning beams $\{\Phi_i\}_{i=1}^b$ with partition $\{u_k\}_{k=1}^M$, M<2b. The set $\{c_i\}_{i=1}^{2b}$ can be created including all the end points of the scanning beams in an ascending manner i.e., $c_i \leq c_j$ for $i \leq j$. Define the beams $\{\Phi_i'\}_{i=1}^b$ as $\Phi_i'=(c_i, c_{i+b}]$. These beams form the partition $\{u_k'\}_{k=1}^{M'}$, $M' \geq M$. It is easy to verify that these UR's are contiguous and the partition $\{u_k\}_{k=1}^M$ is formed by grouping $u_k'$'s together. Therefore, $\{u_k'\}_{k=1}^{M'}$ has less expected width then $\{u_k\}_{k=1}^M$.

Theorem 7 below bounds the optimal performance when contiguous scanning beams are used.

Theorem 7. The optimal value of the objective function U* in optimization problem (5) when contiguous scanning beams are used is bounded as $$\frac{2^{h(\Psi)}}{2b} \leq U^* \leq \frac{\pi}{b}. \quad (22)$$

Proof. The lower-bound is derived similar to that of Theorem 3 using the maximum number of regions as 2b following Proposition 6. For the upper-bound, consider the following beams $$\Phi_i = \left(\frac{(i-1)\pi}{b}, \pi + \frac{(i-1)\pi}{b}\right], i \in [b] \quad (23)$$

Figure 6:
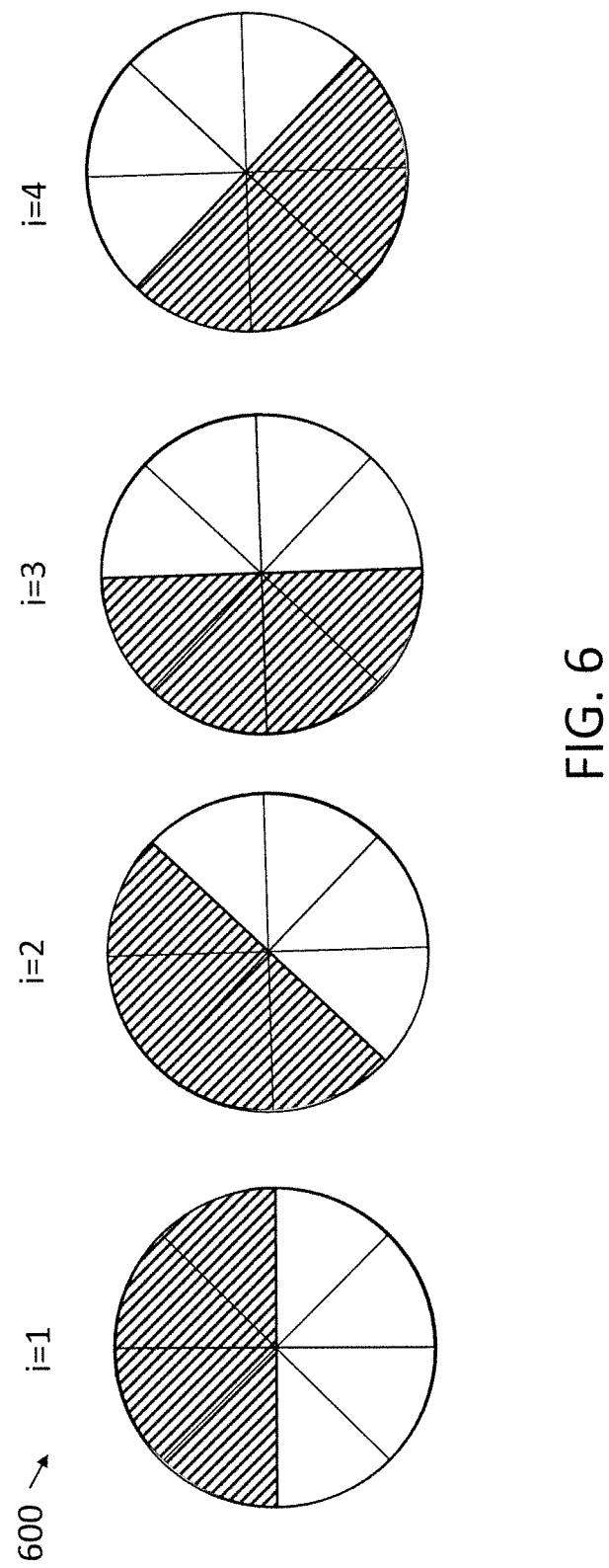
FIG. 6 is a block diagram showing an exemplary proposed BA strategy when scanning beams are contiguous for b=4 in the proof of Theorem 7, in accordance with an embodiment of the present invention.

These beams 600, illustrated in FIG. 6 for b=4, result in expected uncertainty of $$\frac{\pi}{b}.$$

Using Proposition 6 and following a similar approach as in Theorem 5, the following theorem provides the optimal set of scanning beams for the optimization problem in Equation (5). Note that for the uniform distribution on the AoD, the optimal set of contiguous beams corresponds to the ones used in the upper-bound of Theorem 7 and illustrated in FIG. 6 for b=4.

Theorem 8. The optimal contiguous scanning beams in (5) are given by $$\Phi_i = (x_i^*, x_{i+b}^*], i \in [b], \quad (24)$$

where $x_i^*$, $i \in [2b]$ are the solution to the optimization (20) with M=2b regions.

This section is concluded by comparing the performance of the present invention with an adaptation of ES to the model. The scanning beams in ES are defined by $$\Phi_i = \left((i-1)\frac{2\pi}{b+1}, i\frac{2\pi}{b+1}\right], i \in [b].$$

Figure 7:
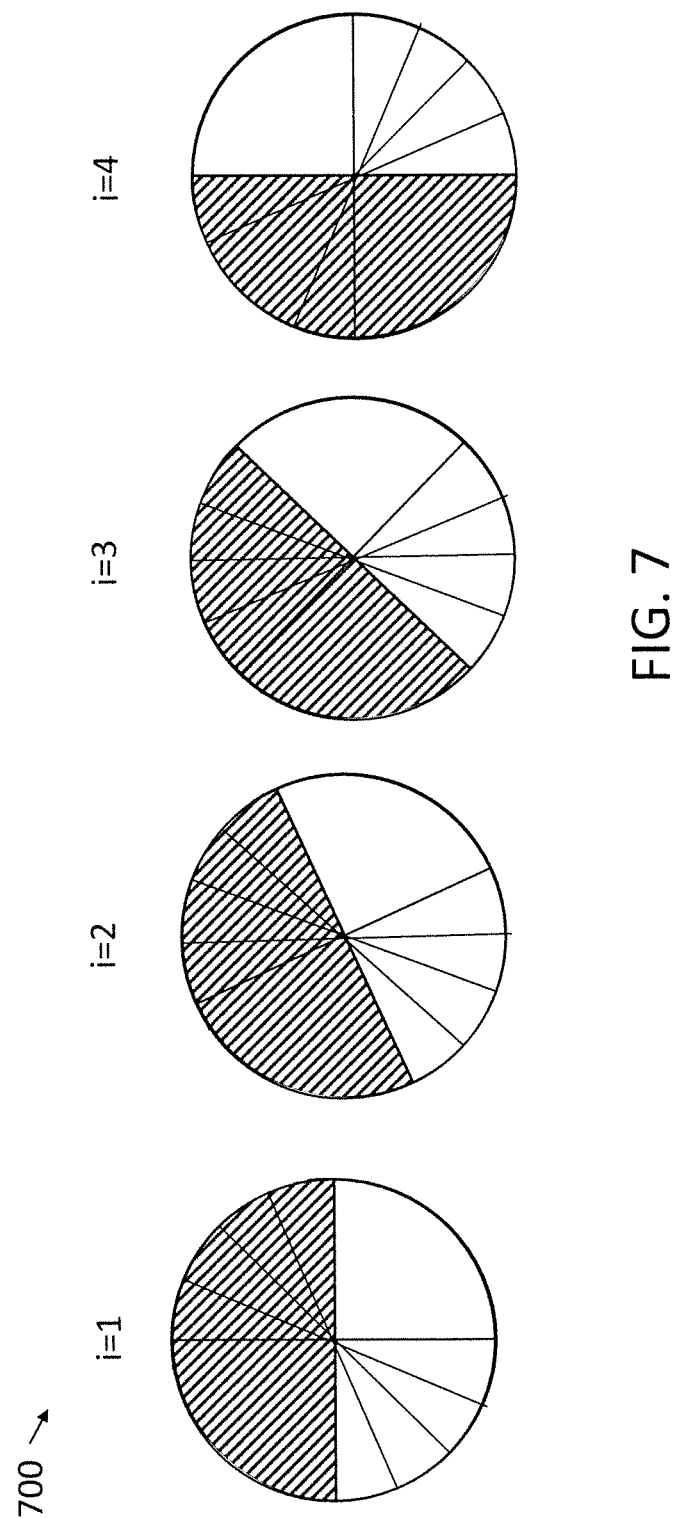
FIG. 7 is a block diagram showing scanning beams and corresponding URs of the example of FIG. 5 when b=4, in accordance with an embodiment of the present invention.

To have a fair comparison, it is presumed that the optimal contiguous scanning beams from Theorem 8 are used since ES beams are also contiguous. Considering a uniform PDF on the AoD, it can be seen that the performance of ES is $$\overline{U}_{ES} = \frac{2\pi}{b+1}$$

while the performance of the approach in accordance with the present invention is $$\overline{U}^* = \frac{\pi}{b}$$

resulting in a factor of two gain for sufficiently large values of b. Furthermore, the gain can be larger than 2× since unlike ES, the proposed method exploits the distribution of AoD. For instance, the gains are 1.53×, 2×, 2.4×, 2.7×, 2.86× for b=2 3, 4, 5, 6, respectively, when the piecewise uniform distribution $$\Psi \sim f_\Psi = \text{Uniform}\left(\left(0, \frac{\pi}{2}\right] \cup \left(\pi, \frac{3\pi}{2}\right]\right)$$

is adopted. This distribution can represent for example a two-user scenario where $$f\Psi_1 = \text{Uniform}\left(\left(, \frac{\pi}{2}\right]\right), f\Psi_2 = \text{Uniform}\left(\left(\pi, \frac{3\pi}{2}\right]\right),$$

and $w_1=w_2=\frac{1}{2}$. The difference between the upper-bound and lower-bound presented in Theorem 7 is sufficiently small for relatively large values of b such that one can use the construction introduced in the proof of that Theorem to achieve the upper bound. FIG. 7 illustrates the optimal scanning beams 700 along with the corresponding URs for b=4 when PDF is $f_\Psi$. It is observed that the optimal strategy creates narrower URs in the first and third quarters where the PDF is non-zero as expected.

Herein, the multi-user noninteractive beam alignment problem in mmWave systems has been investigated where the objective is to minimize the average of expected width of remaining uncertainty regions on the AoDs after receiving users' feedbacks. The problem is investigated for two scenarios: i) when there are no constraints on the beam alignment scanning beams and ii) when they have to be contiguous. Information has been provided on theoretic bounds on the optimal performance and proposed methods to design the optimal scanning beams for both scenarios. Additionally, it has been proved that using optimal contiguous scanning beams will lead to contiguous uncertainty regions for users which implies that a contiguous beam can also be used for data communications after the beam alignment. Furthermore, it has been shown that the performance of the proposed approach improves that of exhaustive search, a well-known approach considered in 5G standard, by a factor of two.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for finding a data transmission beam from an Access Point (AP) to a User Equipment (UE) in a communication system, the method comprising:
   sending a plurality of probing packets from the AP to the UE using a dedicated probing beam selected for each probing packet from among a set of probing beams;
   receiving feedback from the UE regarding the plurality of probing packets; and
   computing the data transmission beam based on the received feedback and the set of probing beams,
   wherein each of the probing beams from the set of probing beams comprises a respective single contiguous main lobe from a set of single contiguous main lobes, and wherein a transmitted power of each of the probing beams outside the respective contiguous main lobe is negligible.

2. The computer-implemented method of claim 1, wherein respective single contiguous main lobes of at least two probing beams from the set of probing beams overlap.

3. The computer-implemented method of claim 1, wherein a constraint is imposed such that the respective single contiguous main lobe of a given one of the probing beams from the set does not overlap with more than two respective single contiguous main lobes of other beams in the set.

4. The computer-implemented method of claim 1, wherein feedbacks from a plurality of UEs, including the UE, are received, and a data transmission beam for a given UE is computed based on the feedbacks received from the given UE.

5. The computer-implemented method of claim 1, wherein the set of probing beams is designed based on prior knowledge about a communication channel between the AP and a plurality of UEs including the UE.

6. The computer-implemented method of claim 1, wherein a number of possible data transmission beams is less than or equal to twice a number of probing beams from the set used far a transmission of the plurality of probing packets.

7. The computer-implemented method of claim I, wherein a number of possible data transmission beams is equal to twice a number of the probing beams in. the set used for a transmission of the plurality of probing packets.

8. The computer-implemented method of claim 7, wherein the set of probing beams is designed such that a probability of receiving a positive feedback from the UE for each possible data transmission beam is almost equal within a threshold amount.

9. The computer-implemented method of claim 7, wherein the set of probing beams is designed such that an expected measure of a size of a single continuous main lobe of a data transmission beam is minimized.

10. The computer-implemented mets od of claim 7, wherein the set of probing beams is designed such that a multiplication of a probability of receiving positive feedback from the UE by a measure of a size of a single contiguous main lobe for each possible data transmission beam is almost equal within a threshold amount.

11. A computer program product for finding a data transmission beam from an Access Point (AP) to a User Equipment (UE) in a communication system, the computer program product comprising a non-transitory computer readable storage medium having progr instructions embodied therewith, the program instructions executable by a computer to cause the computer to perform a method comprising:
   sending a plurality of probing packets from the AP to the UE using a dedicated probing beam selected for each probing packet from among a set of probing beams;
   receiving feedback from the LIE regarding the plurality of probing packets; and
   computing the data transmission beam based on the received feedback and the set of probing beams,
   wherein each of the probing beams from the set of probing beams comprises a respective single contiguous main lobe from a set of single contiguous main lobes, and wherein a transmitted power of each of the probing beams outside the respective contiguous main lobe is negligible.

12. The computer program product of claim 11, wherein respective single contiguous main lobes of at least two probing beams from the set of probing beams overlap.

13. The computer program product of claim 11, wherein a constraint is imposed such that respective single contiguous main lobes of no more than two probing beams from the set of probing beams overlap.

14. The computer program product of claim 11, wherein feedbacks from a plurality of UEs, including the UE, are received, and a data transmission for a given UE is computed based on the feedbacks received from the given UE.

15. A computer processing system for finding a data transmission beam from an Access Point (AP) to a User Equipment (UE) in a communication system, the computer processing system comprising:
   a memory device for storing program code; and
   a hardware processor operatively coupled to the memory device for running the program code to:
      send a plurality of probing packets from the AP to the UE using a dedicated probing beam selected for each probing packet from among a set of probing beams;
      receive feedback from the UE regarding the plurality of probing packets; and
      compute the data transmission beam based on the received feedback and the set of probing beams,
      wherein each of the probing beams from the set of probing beams comprises respective single contiguous main lobe from a set of single contiguous main lobes, and wherein a transmitted power of each of the probing beams outside the respective contiguous main lobe is negligible.

16. The computer processing system of claim 15, wherein the access point is comprised in a cellular base station.

* * * * *